US011685580B2

United States Patent
Narayanan et al.

(10) Patent No.: US 11,685,580 B2
(45) Date of Patent: Jun. 27, 2023

(54) MEDICATION COUNTERFEIT DETECTION

(71) Applicant: International Business Machines Corporation, Armonk, NY (US)

(72) Inventors: Rajeev Narayanan, Briarcliff Manor, NY (US); Bing Dang, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/535,038

(22) Filed: Aug. 7, 2019

(65) Prior Publication Data

US 2021/0039851 A1 Feb. 11, 2021

(51) Int. Cl.
| | | |
|---|---|---|
| *B65D 55/06* | (2006.01) | |
| *B65D 55/02* | (2006.01) | |
| *A61J 1/03* | (2023.01) | |
| *H04L 67/12* | (2022.01) | |

(52) U.S. Cl.
CPC ............ *B65D 55/028* (2013.01); *A61J 1/035* (2013.01); *A61J 2200/70* (2013.01); *H04L 67/12* (2013.01)

(58) Field of Classification Search
CPC .............. B65D 55/028; B65D 2203/10; B65D 55/026; B65D 55/024; B65D 55/04; A61J 1/035; A61J 2200/70; A61J 1/18; H04L 67/12; H04L 67/10; H04L 67/563; G08B 13/126; G06K 19/07; G65D 55/06

See application file for complete search history.

(56) References Cited

U.S. PATENT DOCUMENTS

| | | | | |
|---|---|---|---|---|
| 4,339,746 A | * | 7/1982 | Ulicki ................. | G08B 26/008 340/506 |
| 5,137,208 A | | 8/1992 | Wang et al. | |
| 5,285,734 A | * | 2/1994 | MacPherson ........ | G08B 13/128 109/38 |
| 5,412,372 A | * | 5/1995 | Parkhurst .............. | G16H 20/13 340/568.1 |
| 5,506,566 A | * | 4/1996 | Oldfield ............... | G08B 13/128 340/550 |

(Continued)

FOREIGN PATENT DOCUMENTS

| | | |
|---|---|---|
| CN | 204759469 | 11/2015 |
| CN | 107679605 | 2/2018 |
| WO | 2018172964 | 9/2018 |

OTHER PUBLICATIONS

Hoy, "An Introduction to the Blockchain and Its Implications for Libraries and Medicine", Medical Reference Services Quarterly, Jul. 2017, vol. 36, No. 3, 273-279.

(Continued)

*Primary Examiner* — Hai Phan
*Assistant Examiner* — Son M Tang
(74) *Attorney, Agent, or Firm* — Daniel Morris; Otterstedt & Kammer PLLC

(57) ABSTRACT

A device for detecting a tampering of a product in a product packaging material. The device comprises a network of sensors integrated into the product packaging material; a microcontroller, the microcontroller configured to detect, by accessing the sensors of the sensor network, the tampering of the product packaging material; and a communication device for relaying information regarding a status of the product packaging material.

13 Claims, 13 Drawing Sheets

(56) References Cited

U.S. PATENT DOCUMENTS

| | | | | |
|---|---|---|---|---|
| 6,259,369 | B1* | 7/2001 | Monico | G06K 19/07749 |
| | | | | 156/291 |
| 6,592,034 | B1* | 7/2003 | Millard | B65D 55/02 |
| | | | | 235/449 |
| 6,720,866 | B1* | 4/2004 | Sorrells | G06K 19/0723 |
| | | | | 340/10.4 |
| 6,973,371 | B1* | 12/2005 | Benouali | A61J 7/0481 |
| | | | | 700/244 |
| 7,126,879 | B2* | 10/2006 | Snyder | G06F 19/3462 |
| | | | | 368/10 |
| 7,301,460 | B2* | 11/2007 | Coste | B65D 5/4212 |
| | | | | 340/539.31 |
| 7,451,876 | B2* | 11/2008 | Bossi | A61J 1/035 |
| | | | | 206/459.5 |
| 7,468,664 | B2* | 12/2008 | Daughton | G01R 33/093 |
| | | | | 340/551 |
| 7,502,666 | B2* | 3/2009 | Siegel | G06F 19/3462 |
| | | | | 700/244 |
| 7,688,206 | B2 | 3/2010 | Carrender | |
| 7,726,485 | B2* | 6/2010 | Brollier | A61J 7/0481 |
| | | | | 206/534 |
| 7,755,489 | B2* | 7/2010 | Georgescu | G01N 29/043 |
| | | | | 333/150 |
| 8,025,149 | B2* | 9/2011 | Sterry | A61J 7/0436 |
| | | | | 206/534 |
| 8,091,790 | B2* | 1/2012 | Mickle | B65D 75/327 |
| | | | | 235/435 |
| 8,151,990 | B2* | 4/2012 | Udo | A61J 7/0481 |
| | | | | 206/534 |
| 8,531,298 | B2* | 9/2013 | Tuttle | G06K 19/07749 |
| | | | | 340/572.1 |
| 8,960,440 | B1* | 2/2015 | Kronberg | A61J 1/035 |
| | | | | 206/531 |
| 9,076,092 | B2* | 7/2015 | Ritamaki | G06K 19/07786 |
| 9,125,797 | B2* | 9/2015 | Khasnis | A61J 7/0418 |
| 9,387,148 | B2* | 7/2016 | Rosenbaum | A61J 1/035 |
| 9,622,942 | B2* | 4/2017 | Maijala | A61J 7/0481 |
| 9,740,888 | B1* | 8/2017 | Aga | G06F 21/86 |
| 9,741,222 | B1* | 8/2017 | Scharfeld | G06K 19/07798 |
| 9,904,885 | B2* | 2/2018 | Sengstaken, Jr. | A61J 1/035 |
| 10,013,534 | B2* | 7/2018 | Blochet | G06F 19/3462 |
| 10,089,445 | B2* | 10/2018 | Lesau | B65D 75/54 |
| 10,108,892 | B2* | 10/2018 | Sengstaken, Jr. | A61J 7/049 |
| 10,136,519 | B2* | 11/2018 | Brodsky | H05K 3/10 |
| 10,185,811 | B2* | 1/2019 | Dixit | G06F 19/00 |
| 10,224,902 | B2* | 3/2019 | Rokhsaz | H03J 3/20 |
| 10,265,246 | B2* | 4/2019 | Dantsker | A61J 7/04 |
| 10,278,287 | B2* | 4/2019 | Wilson | H05K 1/118 |
| 10,463,574 | B1* | 11/2019 | Mohamed Elmahdy | |
| | | | | G16H 20/13 |
| 10,579,833 | B1* | 3/2020 | Cook | G06F 21/86 |
| 10,650,661 | B2* | 5/2020 | Mehregany | A61J 7/0418 |
| 10,678,382 | B2* | 6/2020 | Forster | G06F 3/044 |
| 10,685,146 | B2* | 6/2020 | Brodsky | H01R 12/59 |
| 10,759,591 | B2* | 9/2020 | Ngo | B65D 75/327 |
| 2002/0017996 | A1* | 2/2002 | Niemiec | A61J 7/0481 |
| | | | | 340/573.1 |
| 2005/0011163 | A1* | 1/2005 | Ehrensvard | G06Q 10/08 |
| | | | | 53/410 |
| 2005/0241983 | A1* | 11/2005 | Snyder | G06F 19/3462 |
| | | | | 206/539 |
| 2005/0242957 | A1* | 11/2005 | Lindsay | G06K 19/07345 |
| | | | | 340/572.7 |
| 2007/0063057 | A1* | 3/2007 | Masubuchi | G06K 19/07767 |
| | | | | 235/492 |
| 2007/0210173 | A1 | 9/2007 | Nagel | |
| 2008/0001741 | A1* | 1/2008 | Cobianu | G08B 13/1454 |
| | | | | 340/568.2 |
| 2008/0075934 | A1 | 3/2008 | Barlow, Jr. et al. | |
| 2008/0221408 | A1* | 9/2008 | Hoarau | A61B 5/4839 |
| | | | | 604/503 |
| 2008/0223936 | A1* | 9/2008 | Mickle | G06K 19/07798 |
| | | | | 235/492 |
| 2008/0303638 | A1 | 12/2008 | Nguyen et al. | |
| 2009/0040044 | A1* | 2/2009 | Chiao | G08B 25/10 |
| | | | | 340/540 |
| 2009/0212950 | A1 | 8/2009 | Cheng | |
| 2010/0062194 | A1* | 3/2010 | Sun | B42D 25/387 |
| | | | | 428/29 |
| 2010/0089791 | A1 | 4/2010 | Rosenbaum et al. | |
| 2010/0212565 | A1* | 8/2010 | Clayman | A41H 42/00 |
| | | | | 112/475.09 |
| 2011/0163457 | A1* | 7/2011 | Mohan | H01L 25/0652 |
| | | | | 257/774 |
| 2011/0273717 | A1* | 11/2011 | Reinhard | G07D 7/121 |
| | | | | 356/445 |
| 2012/0125994 | A1* | 5/2012 | Heath | G06Q 10/10 |
| | | | | 235/375 |
| 2013/0195326 | A1* | 8/2013 | Bear | A61J 7/0084 |
| | | | | 382/128 |
| 2013/0207783 | A1 | 8/2013 | Cruzado et al. | |
| 2013/0233035 | A1 | 9/2013 | Mulllis et al. | |
| 2013/0250663 | A1* | 9/2013 | Katti | H01L 23/576 |
| | | | | 365/158 |
| 2013/0265156 | A1 | 10/2013 | Brinkley et al. | |
| 2014/0002631 | A1* | 1/2014 | Amano | G06V 20/66 |
| | | | | 348/86 |
| 2015/0278558 | A1* | 10/2015 | Priev | G06F 21/88 |
| | | | | 726/35 |
| 2016/0103085 | A1* | 4/2016 | Mehregany | H05K 7/02 |
| | | | | 324/71.1 |
| 2016/0137380 | A1* | 5/2016 | Kosaka | A61J 7/0436 |
| | | | | 206/459.1 |
| 2016/0147976 | A1* | 5/2016 | Jain | G16H 10/60 |
| | | | | 705/2 |
| 2016/0158109 | A1* | 6/2016 | Nova | A61J 7/0481 |
| | | | | 206/534 |
| 2016/0188927 | A1* | 6/2016 | Rokhsaz | G06K 7/10366 |
| | | | | 340/10.4 |
| 2017/0046501 | A1* | 2/2017 | Coleman | A61J 7/0427 |
| 2017/0104224 | A1* | 4/2017 | Hahn | H01M 10/0436 |
| 2017/0165151 | A1 | 6/2017 | Schmid et al. | |
| 2017/0215761 | A1 | 8/2017 | Zdeblick | |
| 2017/0285858 | A1* | 10/2017 | Kursula | G06F 3/016 |
| 2017/0294105 | A1* | 10/2017 | Mehregany | G08B 21/24 |
| 2018/0289591 | A1* | 10/2018 | French | A61J 7/0481 |
| 2019/0187856 | A1* | 6/2019 | Bruwer | G06F 3/03547 |
| 2019/0355462 | A1* | 11/2019 | Isom | G16H 20/13 |
| 2020/0005237 | A1* | 1/2020 | Simons | G06K 19/06037 |
| 2020/0043869 | A1* | 2/2020 | Yanamadala | G01R 31/2884 |
| 2020/0051015 | A1* | 2/2020 | Davis | G06Q 10/0833 |
| 2020/0390211 | A1* | 12/2020 | Kim | A45C 11/00 |
| 2021/0272058 | A1* | 9/2021 | Kourtis | G16H 20/10 |

OTHER PUBLICATIONS

Price, "Pharmacovigilance in Crisis: Drug Safety at a Crossroads." Clinical therapeutics 40.5 (Mar. 2018): 790-797.

Tseng et al. "Governance on the Drug Supply Chain via Gcoin Blockchain." International journal of environmental research and public health 15.6 (May 2018): 1055.

Peter Mell, "The NIST Definition of Cloud Computing," Special Publication 800-145; pp. 1-7, Sep. 2011.

Wu, Guangping. PRC(ISA/CN) as ISA. Patent Cooperation Treaty International Search Report, PCT/IB2020/055918, dated Sep. 23, 2020, 9 pages.

\* cited by examiner

MEDICATION COUNTERFEIT DETECTION

BACKGROUND

The present invention relates to the electrical, electronic and computer arts, and more specifically, to techniques for detecting counterfeit medication.

The counterfeiting of meditations comes in many forms and at many stages of the pharmaceutical supply chain. Counterfeit medications, ranging from copies of branded drugs and generic drugs to over-the-counter drugs and the like, have been discovered with no active ingredients or with dangerous levels of impurities. The U.S. Food and Drug Administration estimates that nearly 15% of imported pharmaceuticals contain unapproved substances. Drug counterfeiting has become a $75-200 billion business annually, according to the World Customs Organization. Countries have introduced track-and-trace laws to help regulate products as they pass through the supply chain, and by early 2018 more than 75% of the world's prescription medicines will be legally protected, according to a report by PMMI (The Association for Packaging and Processing Technologies, formally known as Packaging Machinery Manufacturers Institute).

Counterfeiting can theoretically happen at any point in the supply chain. For example, lasers can be used during the distribution stage to open packaging and counterfeit medications can be substituted for the genuine medications. Moreover, there are a number of key challenges in detecting counterfeit pharmaceuticals. There is often a lack of coordination at all stages and levels of the supply chain. There is often limited visibility into the supply chain, which may cover a large geographic area. Warehouses must be properly managed and medication expiration dates must be constantly considered during the supply chain management. The medication supply chain can help track the package, but not the pills themselves.

SUMMARY

Principles of the invention provide techniques for the detection of counterfeit medication. In one aspect, an exemplary method includes the operations of sensing a value from each column and row of a corresponding matrix of sensors; comparing the values with an initial or expected reading of the corresponding matrix of sensors to identify one or more columns and one or more rows with changed values; and determining one or more sensors that correspond to the one or more identified columns and the one or more identified rows.

In one example embodiment, a device for detecting a tampering of a product in a product packaging material comprises: a network of sensors integrated into the product packaging material; a microcontroller, the microcontroller configured to detect, by accessing the sensors of the sensor network, the tampering of the product packaging material; and a communication device for relaying information regarding a status of the product packaging material.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor/microcontroller that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor/microcontroller, or (iii) a combination of (i) and (ii); any of (i)-(iii) implement the specific techniques set forth herein.

Techniques of the present invention can provide substantial beneficial technical effects. For example, one or more embodiments provide one or more of:

intelligent medication packaging, including pill bottles and blister packs;

detection of counterfeit medications; and detection of tampering with medication packaging.

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

Figure 1:
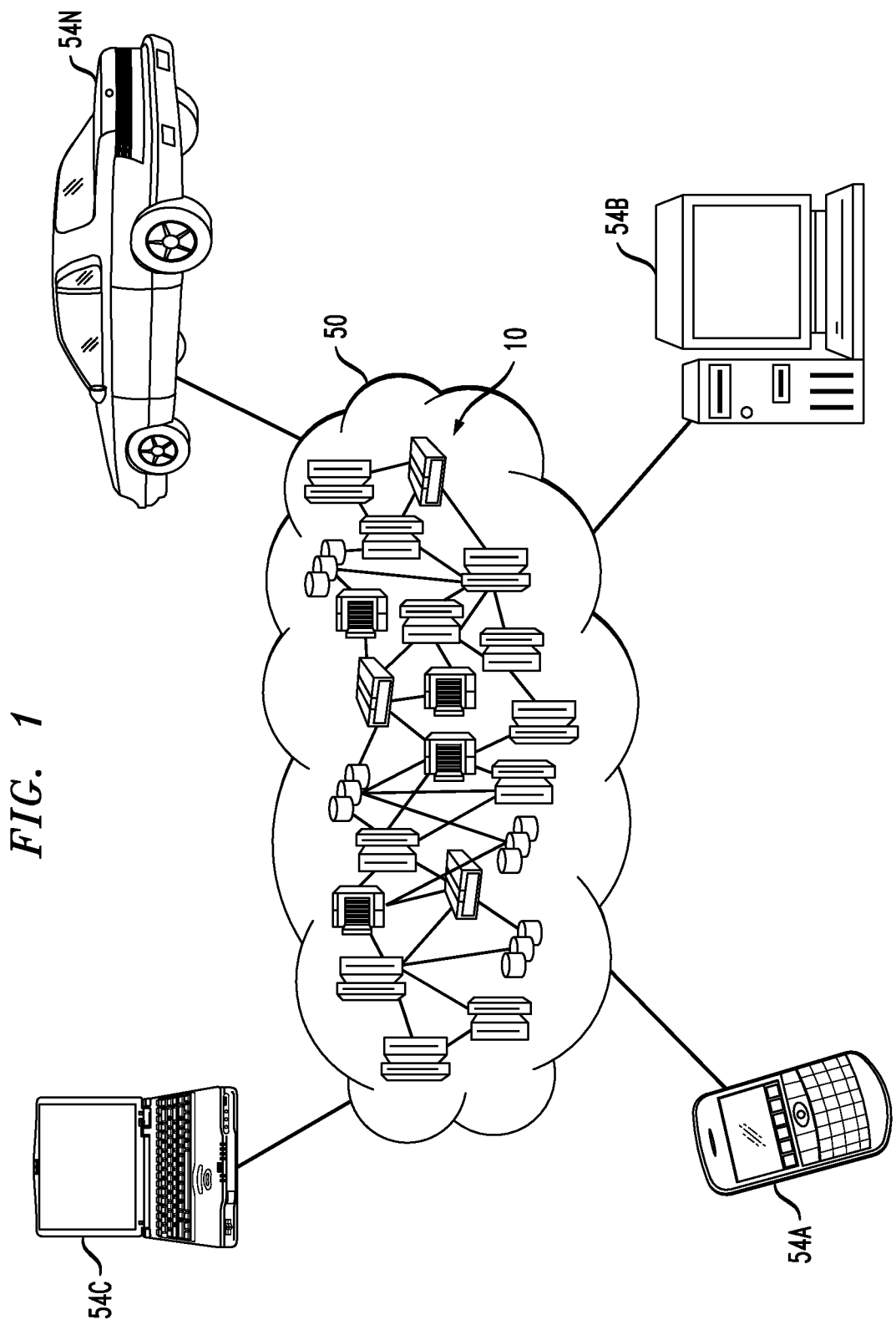
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
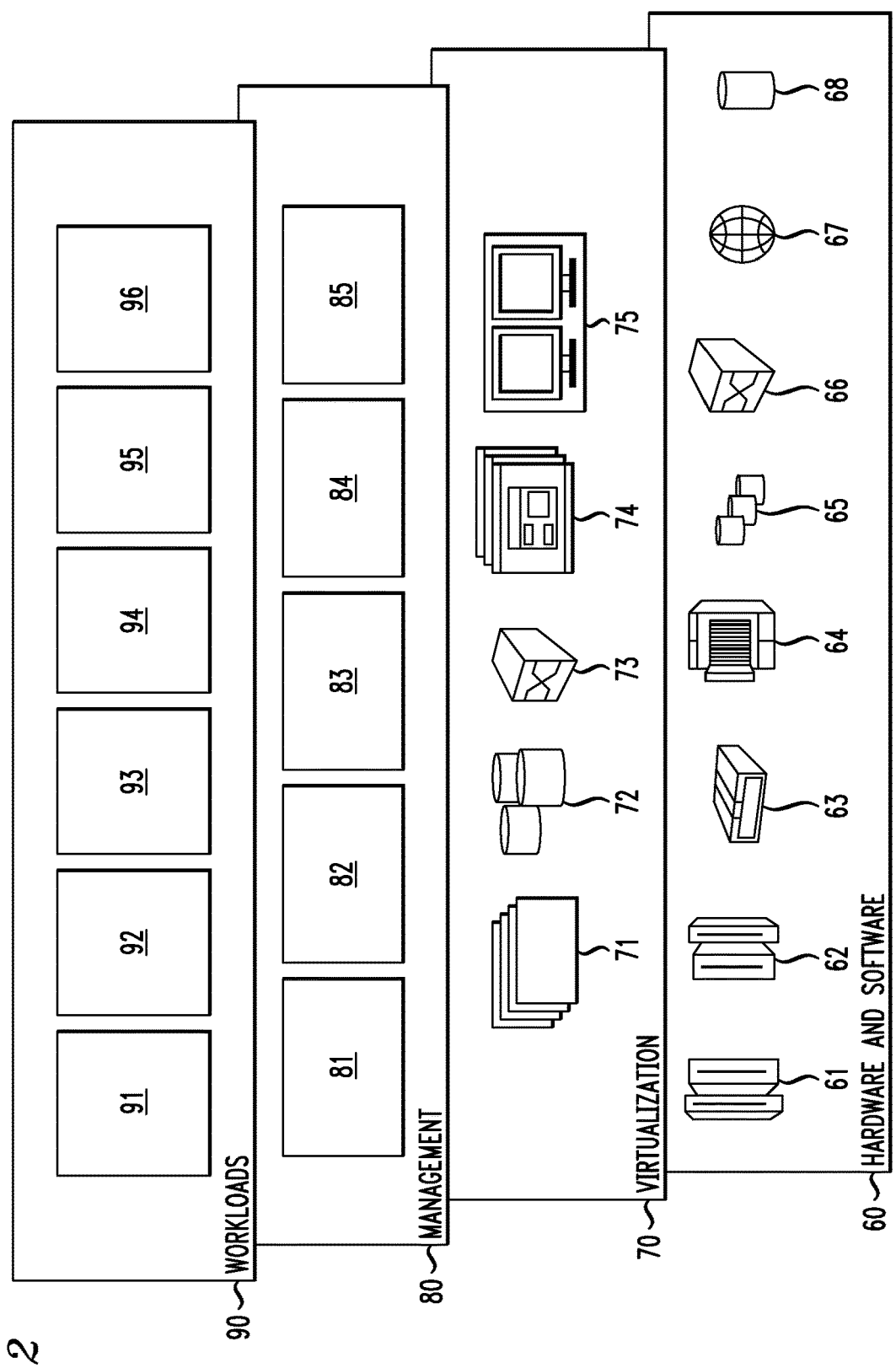
FIG. 2 depicts abstraction model layers according to an embodiment of the present invention.

Referring now to FIG. 2, a set of functional abstraction layers provided by cloud computing environment 50 (FIG. 2) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and medication monitoring system 96.

Figure 3:
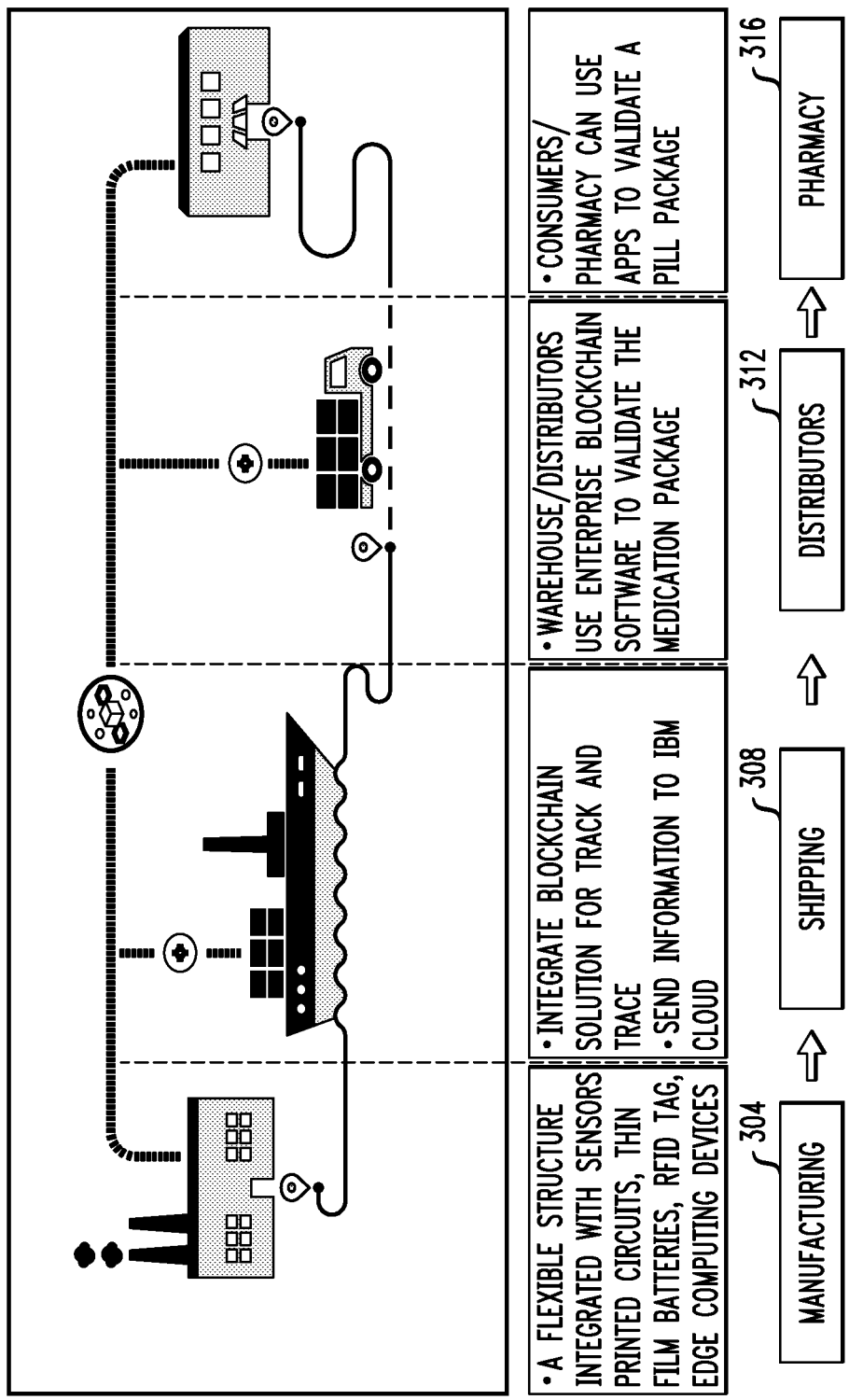
FIG. 3 is a workflow of an example pharmaceutical supply chain, in accordance with an example embodiment.

Generally, methods and systems for detecting counterfeit medications are disclosed. FIG. 3 is a workflow of an example pharmaceutical supply chain, in accordance with an example embodiment. In one example embodiment, during a manufacturing phase 304, an intelligent package is configured with active network sensors, passive network sensors, optical network sensors, or any combination thereof, which are integrated with an edge computing controller, a thin-film battery, and a communication device, which can be used to validate the authenticity of a medication contained within the intelligent package. In one example embodiment, the intelligent package includes a flexible substrate with a thickness of, for example, 1-2 millimeter (mm), and incorporates printed circuits that can be molded onto a blister pack, a pill bottle, and the like of various shapes and sizes. The intelligent package can be tracked through shipping 308 and distribution 312, including delivery to a consumer or pharmacy at 316. Block 316 includes a retail phase, where pharmacies and other retail outlets use various applications to validate the security measures available to the intelligent packaging. It should be understood that the tracking can be facilitated by a variety of methods, including blockchain methods and algorithms for supply chain logistics, Radio Frequency Identifications (RFIDs), holograms, and other signatures along with a one-time key enablement for package authentication that cannot be reused/recreated.

Figure 4:
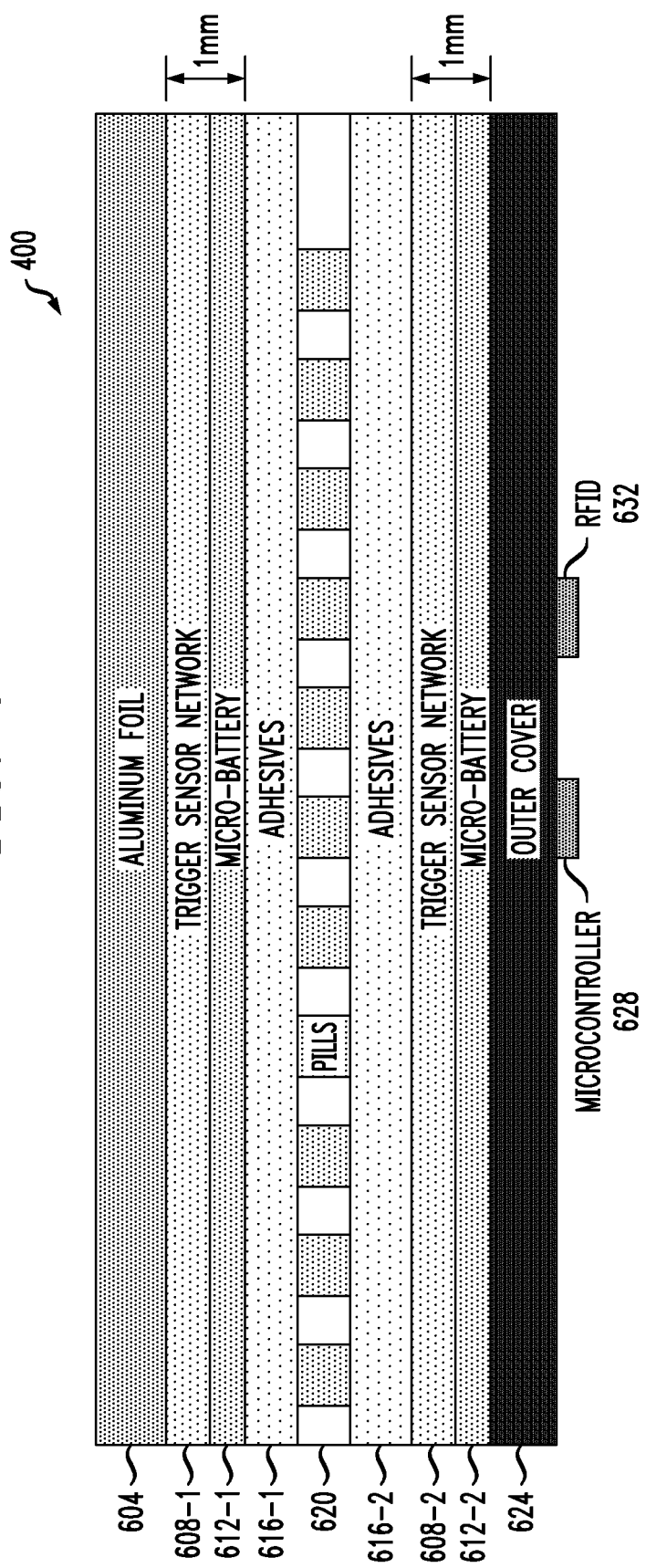
FIG. 4 is a cross-sectional view of an example intelligent package for distributing pills and capsules, in accordance with an example embodiment.

FIG. 4 is a cross-sectional view of an example intelligent package 600 for distributing pills and capsules, in accordance with an example embodiment. In one example embodiment, a sensor layer 608-1 and a micro-battery layer 612-1 are inserted between an aluminum foil or any medically-approved metal cover layer 604 and an adhesive layer 616-1. The micro-battery layer 612-1 features one or more micro-batteries that may be pre-charged, may be charged, for example, by an electronic scanner that is obtaining information from the package 600, and the like. The micro-batteries can be charged through near field communication (NFC) or photovoltaic based methods. A sensor layer 608-2 and a micro-battery layer 612-2 are inserted between an adhesive layer 616-2 and an outer cover layer 624. Each sensor layer (608-1 and 608-2, generally referred to as 608 herein) includes a matrix of trigger sensors (a trigger sensor network) used to determine if the package has been opened and/or tampered with. An analog multiplexer and analog-to-digital converter (ADC) integrated with the adjacent micro-battery layer (612-1 or 612-2, generally referred to as 612 herein) samples the electrical network of the sensor matrix of the sensor layer (608) (matrix and array are used interchangeably herein). In one example embodiment, in the case of a sensor matrix that incorporates sensors generating a digital output, a digital multiplexer integrated with the adjacent micro-battery layer 612-1 samples the electrical network of a sensor matrix of the sensor layer 608-1. A microcontroller 628 senses/reads the data from the ADC and stores the obtained data. In one example embodiment, the microcontroller 628 also determines which specific pill/capsule slot has been opened and/or tampered with. The results determined by the microcontroller 628 may be encrypted and wirelessly relayed to an external device via, for example, an RFID tag 632.

Figure 5:
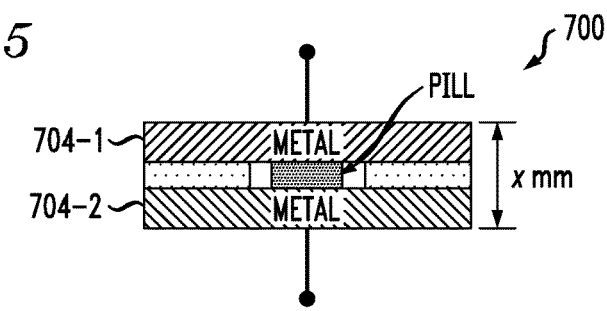
FIGS. 5-8 illustrate an example intelligent package for distributing pills and capsules utilizing a capacitance-based sensor, in accordance with an example embodiment.
Figure 6:
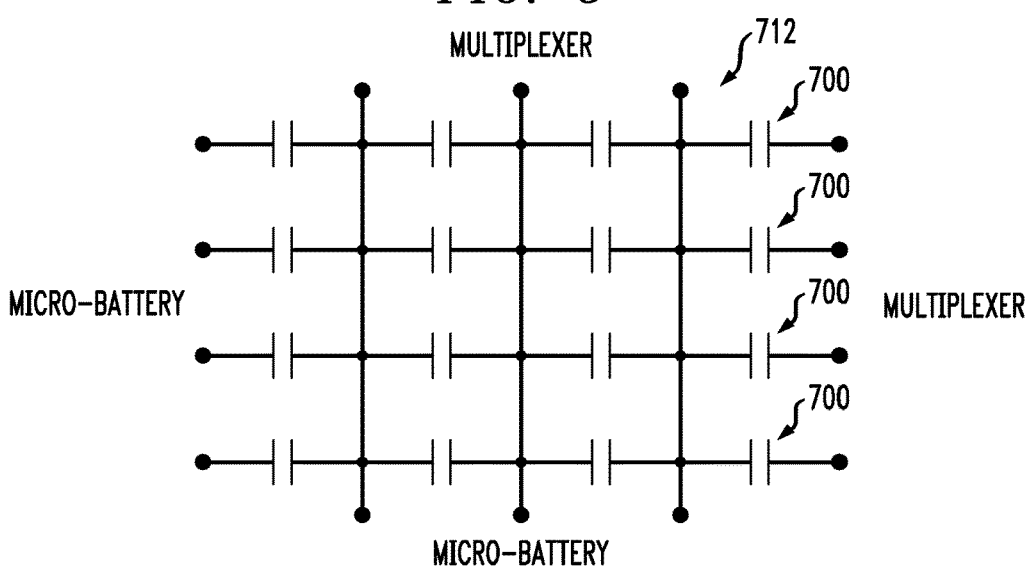
Figure 7:
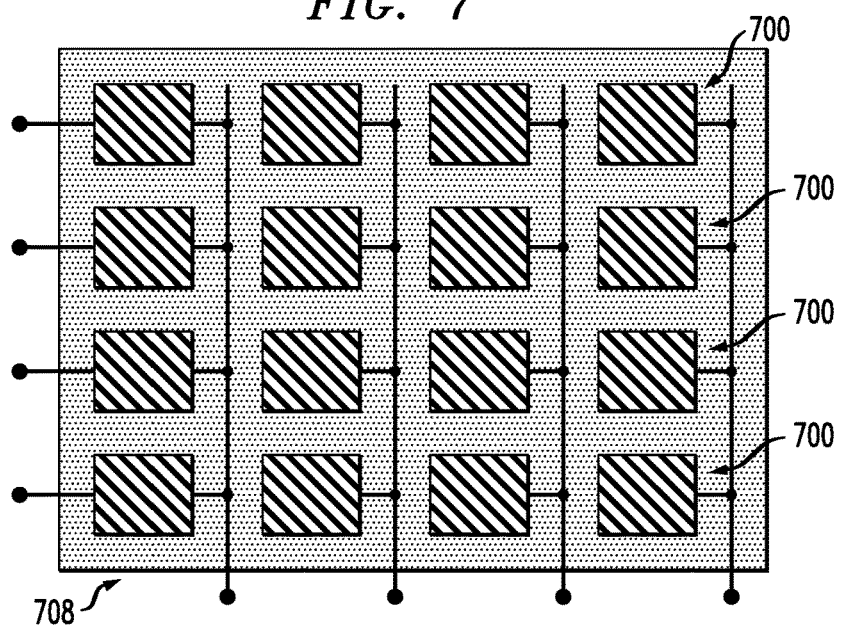
Figure 8:
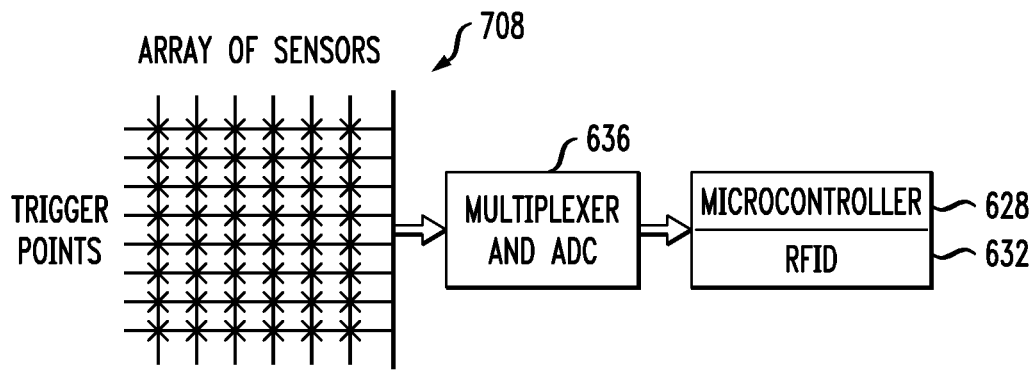

FIGS. 5-8 illustrate an example intelligent package 600 for distributing pills and capsules utilizing a capacitance-based sensor, in accordance with an example embodiment. In one example embodiment, each sensor of the sensor layer 608 is implemented as a capacitor 700 comprising parallel metal plates 704-1, 704-2, as illustrated in FIG. 5. The distance between the parallel metal plates 704-1, 704-2 is selected, for example, to accommodate the type (size) of the pills, the packaging dimensions, and the like. The distance can vary from a few millimeters for smaller pills to centimeters for larger pills. The sensor layer 608 may be installed under the aluminum/other metal foil layer 604, under the plastic outer cover layer 624, or both. An array of sensors 708 (such as capacitors 700), as illustrated in FIGS. 7 and 8, is treated as a network of capacitors 712, as illustrated in FIG. 6. The array of sensors 708, as illustrated in FIG. 8, is connected to an analog multiplexer and analog-to-digital converter (ADC) 636 integrated with the adjacent micro-battery layer 612. The analog multiplexer is used to select one of the rows or columns of the network of capacitors 712 and the ADC converts the signal to a digital value that can be read by the microcontroller 628, as illustrated in FIG. 8. In one example embodiment, any reading by the microcontroller 628 is tagged with a timestamp indicating the time of the reading. In one example embodiment, any changes read by the microcontroller 628 are tagged with a timestamp indicating the time of the reading. In one example embodiment, the capacitors 712 are charged at the time of installing the capacitors 712 onto the intelligent package 600. In one example embodiment, the capacitors 712 are charged using a step-up power management circuit and the micro-battery layer 612, or via near field communications, either during or after manufacturing.

When a pill is removed from the packaging or the packaging is otherwise tampered with, the capacitance of that specific blister pack slot changes, which in turn changes the voltage across the overall network. The change in voltage through the rows and columns in the sensor network triggers the change in the digital value to the microcontroller 628. The change in voltage is mapped by the microcontroller 628 to identify the specific blister pack slot or pill location. The information is transmitted through the RFID tag (or other communication device) to a remote smart device.

Figure 9:
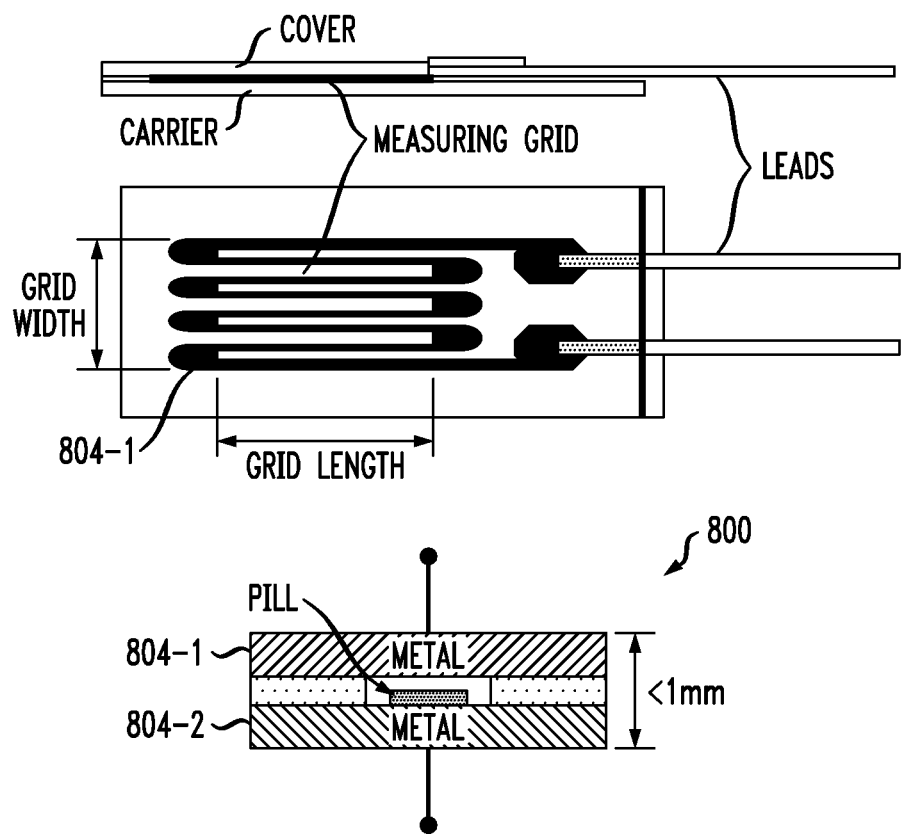
FIGS. 9-10 illustrate an example intelligent package for distributing pills and capsules utilizing a resistance-based sensor, in accordance with an example embodiment.
Figure 10:
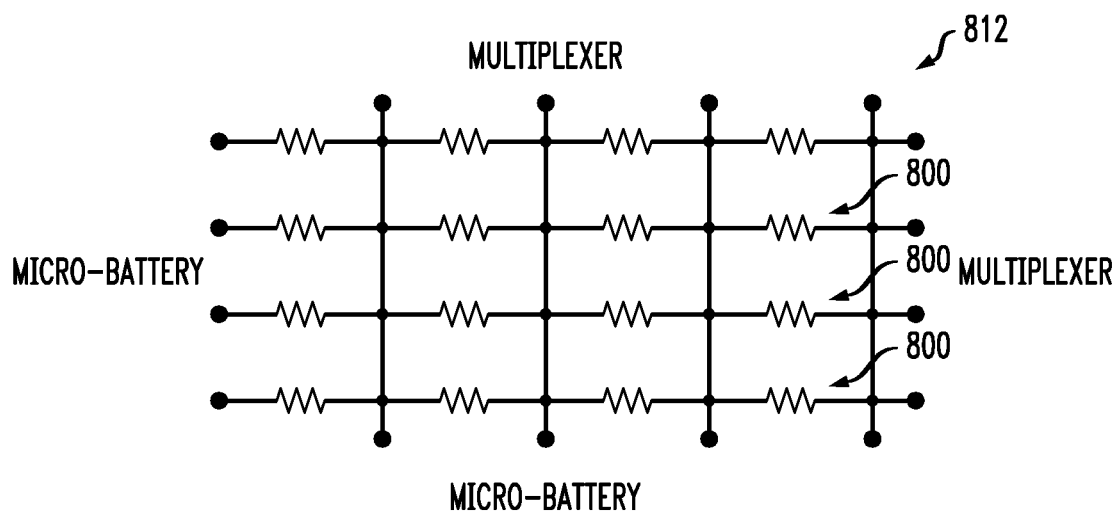

FIGS. 9-10 illustrate an example intelligent package 600 for distributing pills and capsules utilizing a resistance-based sensor, in accordance with an example embodiment. In one example embodiment, each sensor of the sensor layers 608-1, 608-2 is implemented as a resistance sensor 800 comprising metal wire lines 804-1, 804-2, respectively, as illustrated in FIG. 9. The sensor layer 608 may be installed under the aluminum foil layer 604, under the plastic outer cover layer 624, or both. In one example embodiment, the array of sensors 708 incorporates the resistance sensors 800 and is treated as a network of resistance wires 812, as illustrated in FIG. 10, where the cathode of the micro-battery is connected to the terminals of two edges of the network of resistance wires 812 and the anode of the micro-battery is connected to ground. Each terminal of the remaining two edges of the network of resistance wires 812, as illustrated in FIG. 10, is connected to an input terminal of the analog multiplexer and analog-to-digital converter (ADC) 636 integrated with the adjacent micro-battery layer 612. The analog multiplexer is used to select one of the rows or columns of the network of resistance wires 812 and the ADC converts the signal to a digital value that can be read by the microcontroller 628, as illustrated in FIG. 8. In one example embodiment, any reading by the microcontroller 628 is tagged with a timestamp indicating the time of the reading. In one example embodiment, any changes read by the microcontroller 628 are tagged with a timestamp indicating the time of the reading.

In one example embodiment, the resistance wire 812 acts as a capture strain gauge that measures the amount of force applied, if any, to the resistance wire 812. The changes in the resistive value of the resistance wire 812 is relative to the amount of force applied. Based on the thickness of the resistance wire 812, which can be selected and configured according to the blister pack size, any tampering with the pack will likely have an effective change in the resistive value of the resistance wire 812. This force value can be used to detect if the package 600 was tampered with. Similarly, a resistive value of zero indicates a broken resistance wire 812 and evidence of tampering. The resistance thickness can be adjusted based on the packaging dimensions and cost. For example, a thickness of 1 mm may be used. For low current implementations (such as implementations where the total current through the network of resistance wires 812 is less than one amp), a thicker wire and a corresponding lower resistance may be utilized. In one example embodiment, two to three resistive layers (for a total thickness of 2-3 mm) are used to detect tampering.

When a pill is removed from the package 600 or the packaging is otherwise tampered with, the resistance of that specific blister pack slot changes, which in turn changes the voltage across the overall sensor network. The change in voltage through the rows and columns in the sensor network triggers the change in the digital value to the microcontroller 628. The change in voltage is then mapped to identify the specific pill location. The information is then transmitted through the RFID tag (or other communication device) to a remote smart device.

Figure 12:
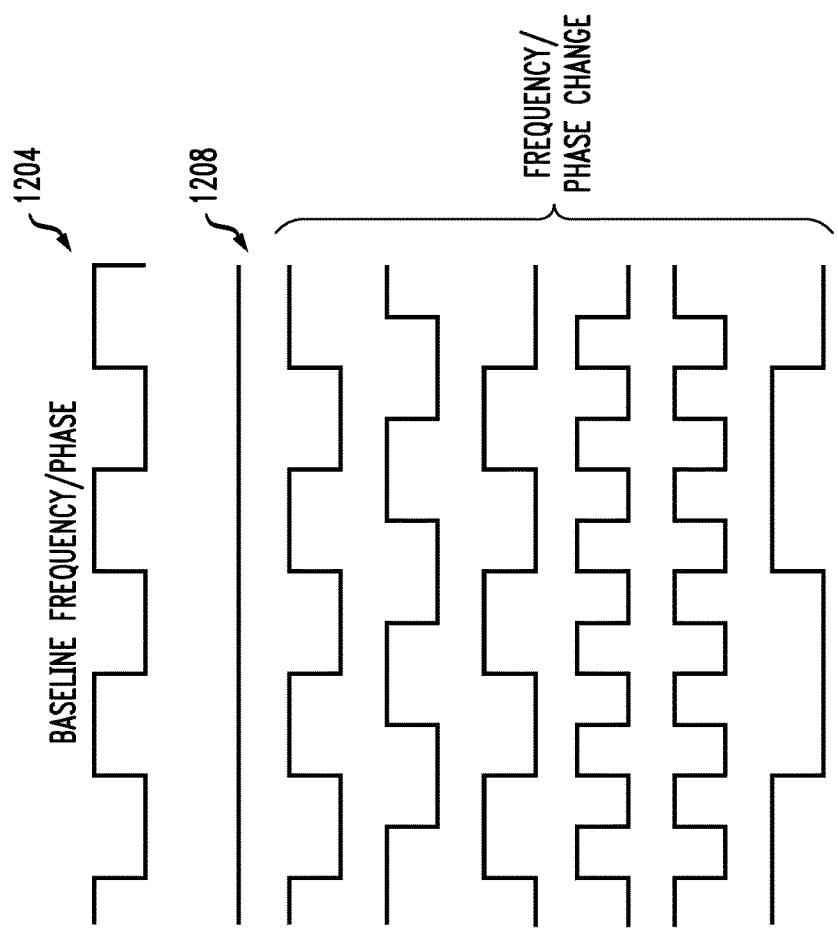
FIGS. 11-13 illustrate an example intelligent package for distributing pills and capsules utilizing a sensor based on a tank circuit, in accordance with an example embodiment.
Figure 11:
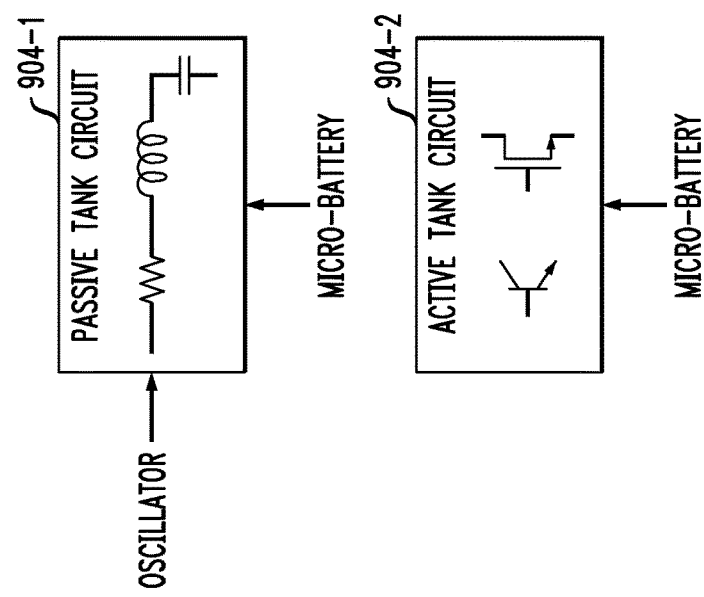
Figure 13:
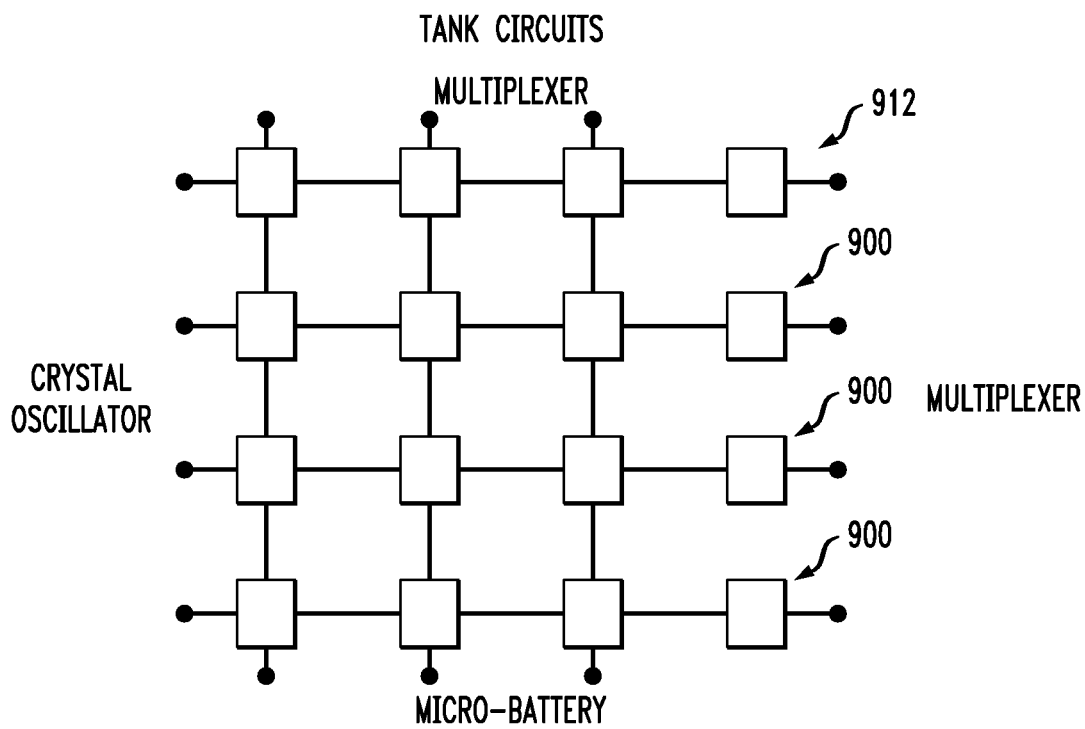

FIGS. 11-13 illustrate an example intelligent package 600 for distributing pills and capsules utilizing a sensor based on a tank circuit, in accordance with an example embodiment. In one example embodiment, the phase and/or frequency of the sensor of the specific blister pack slot is used to detect if the package 600 has been tampered with. In one example embodiment, each sensor of the sensor layer 608 is implemented as a tank circuit comprising a passive tank circuit 904-1 responsive to a signal from an oscillator, such as a crystal oscillator (not shown) or an active tank circuit 904-2 (generally referred to as tank circuits 904 herein), as illustrated in FIG. 11. In one example embodiment, the array of sensors 708 incorporates the tank circuits 904 and is treated as a network of tank circuits 912, as illustrated in FIG. 13. Each tank circuit 904 is designed with a specific (possibly unique) frequency that acts as a signature for the corresponding slot. In one example embodiment, the microcontroller 628 is programmed with the value of the expected frequency for each sensor. The network of tank circuits 912, as illustrated in FIG. 13, is connected to the analog multiplexer and analog-to-digital converter (ADC) 636 integrated with the adjacent micro-battery layer 612. More particularly, each row or column of the network of tank circuits 912, as illustrated in FIG. 13, is connected to one of the inputs of the analog multiplexer and analog-to-digital converter (ADC) 636 integrated with the adjacent micro-battery layer 612. The analog multiplexer is used to select one of the rows or columns of the network of tank circuits 912 and the ADC converts the signal to a digital value that can be read by the microcontroller 628, as illustrated in FIG. 8. The network of tank circuits 912 may be continuously active or may only be activated periodically by the microcontroller 628. In one example embodiment, a signal is generated by the corresponding tank circuit 904 with the frequency and/or phase that corresponds to the specific blister pack slot. The signal is read by the microcontroller 628 via the analog-to-digital converter (ADC) 636 and is then mapped to identify the specific blister pack slot or pill location.

FIG. 12 illustrates a baseline waveform 1204 and various frequency and/or phase changes to the baseline waveform 1204, as depicted in waveforms 1208. Any change to the expected frequency and/or phase of a particular tank circuit 904 (including a frequency of zero) is an indication of possible tampering with the package 600. The information obtained is then transmitted (using a communication device) to a remote smart device. In one example embodiment, any reading by the microcontroller 628 is tagged with a timestamp indicating the time of the reading. In one example embodiment, any changes read by the microcontroller 628 are tagged with a timestamp indicating the time of the reading.

Figure 14:
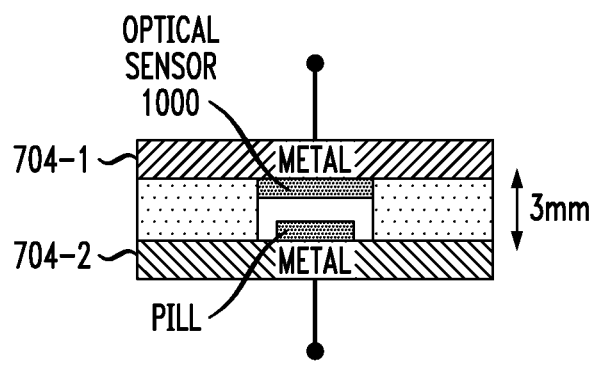
FIGS. 14-15 illustrate an example intelligent package for distributing pills and capsules utilizing an optical-based sensor, in accordance with an example embodiment.
Figure 15:
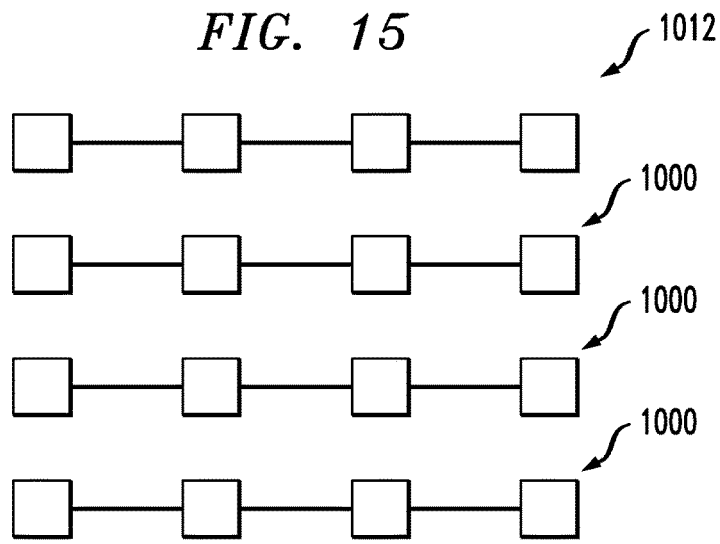

FIGS. 14-15 illustrate an example intelligent package 600 for distributing pills and capsules utilizing an optical-based sensor, in accordance with an example embodiment. In one example embodiment, each sensor of the sensor layer 608 is implemented as an optical sensor 1000, as illustrated in FIG. 14. For example, a UV and IR sensor may be integrated into each blister pack slot and completely sealed. The optical sensor 1000 is powered, for example, via a near-field communication (NFC) device and can read, for example, a specific (2D or 3D) barcode, a hologram, a specific signature of the medication, and the like. In one example embodiment, the optical sensor 1000 can detect a pattern from the reflected light, can detect an embedded character that is unique to the pill, and the like. In one example embodiment, the array of sensors 708 incorporates the optical sensors 1000 and is treated as a network of optical sensors 1012, as illustrated in FIG. 15. The network of optical sensors 1012, as illustrated in FIG. 15, is connected to the analog multiplexer and analog-to-digital converter (ADC) 636 integrated with the adjacent micro-battery layer 612. In one example embodiment, the multiplexer has an input for each optical sensor 1000. Each optical sensor 1000 is individually selected and the signal from the optical sensor 1000 is converted by the analog multiplexer and analog-to-digital converter (ADC) 636 to a digital value that can be read by the microcontroller 628. The microcontroller 628 is programmed with the expected signature of the medication and determines if the medication is genuine or counterfeit based on, for example, the spectrum of the light observed, a detected pattern, a detected embedded character, and the like. The information obtained from the optical sensor 1000 is analyzed and the result is transmitted through the RFID tag (or other communication device) to a remote smart device. In one example embodiment, any reading by the microcontroller 628 is tagged with a timestamp indicating the time of the reading. In one example embodiment, the array 1012 of optical sensors 1000 is utilized in combination with the array 708 of capacitors 700, resistance sensors 800, or tank circuits 900 where the array 1012 of optical sensors 1000 is located between the pills and the array 708 of capacitors 700, resistance sensors 800, or tank circuits 904. In the example embodiment of FIG. 14, the optical sensor 1000 is located between the metal plates 704-1, 704-2 of a capacitor 700.

Figure 16:
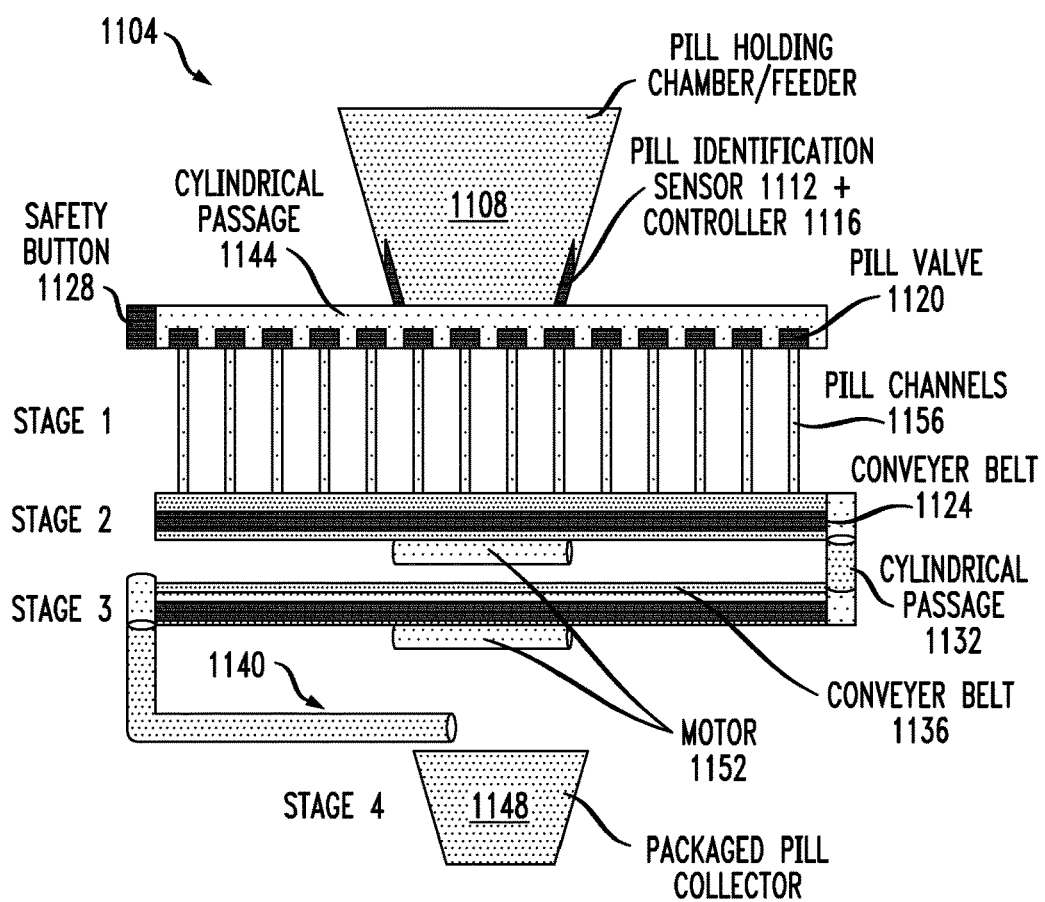
FIG. 16 illustrates an example process for manufacturing an intelligent package for distributing pills and capsules, in accordance with an example embodiment.

FIG. 16 illustrates an example stick-on machine 1104 and process for manufacturing an intelligent package 600 in accordance with an example embodiment. In one example embodiment, the stick-on machine 1104 performs four stages (Stages 1-4). The stick-on machine 1104, including electrical and mechanical structures, populates the pills and capsules and attaching electronic devices onto the intelligent package 600. The stick-on machine 1104 may be implemented as a table-top machine.

During stage 1, a pill holding chamber/feeder 1108 is filled with pills or capsules. The pill holding chamber/feeder 1108 is an air tight, sealed chamber where pills and capsules are stored for further processing and packaging. A pair of pill identification sensors 1112 and an associated controller 1116 are used to identify, or confirm the identity of, the type, brand, and size of the pills. The pills pass via a cylindrical passage 1144 to a mechanical pill valve 1120. The mechanical pill valve 1120 opens and closes (based on an output of the controller 1116) to distribute the pills via pill channels 1156 across a first conveyer belt system 1124 (driven by a motor system 1152). Various pill size channels are available to accommodate different pill sizes. A safety button 1128 is available to shutdown the machine in case of a malfunction.

During stage 2, the first conveyer belt system 1124 forwards the pills to a second conveyer belt system 1136 (also driven by the motor system 1152) of the next stage via a cylindrical passage 1132. During stage 3, the second conveyer belt system 1136 uses an external feed-through mechanism (not shown) to insert the pills into the blister slots and an electronic arm (not shown) for installing the electronic devices (such as the micro-battery layer 612-1, the sensor layer 608-2, the micro-battery layer 612-2, the microcontroller 628, and the like), the aluminum/other metal foil layer 604, and the plastic outer cover layer 624. During stage 4, the completed intelligent package 600 passes via chute 1140 into the packaged pill collection chamber 1148.

Figure 17:
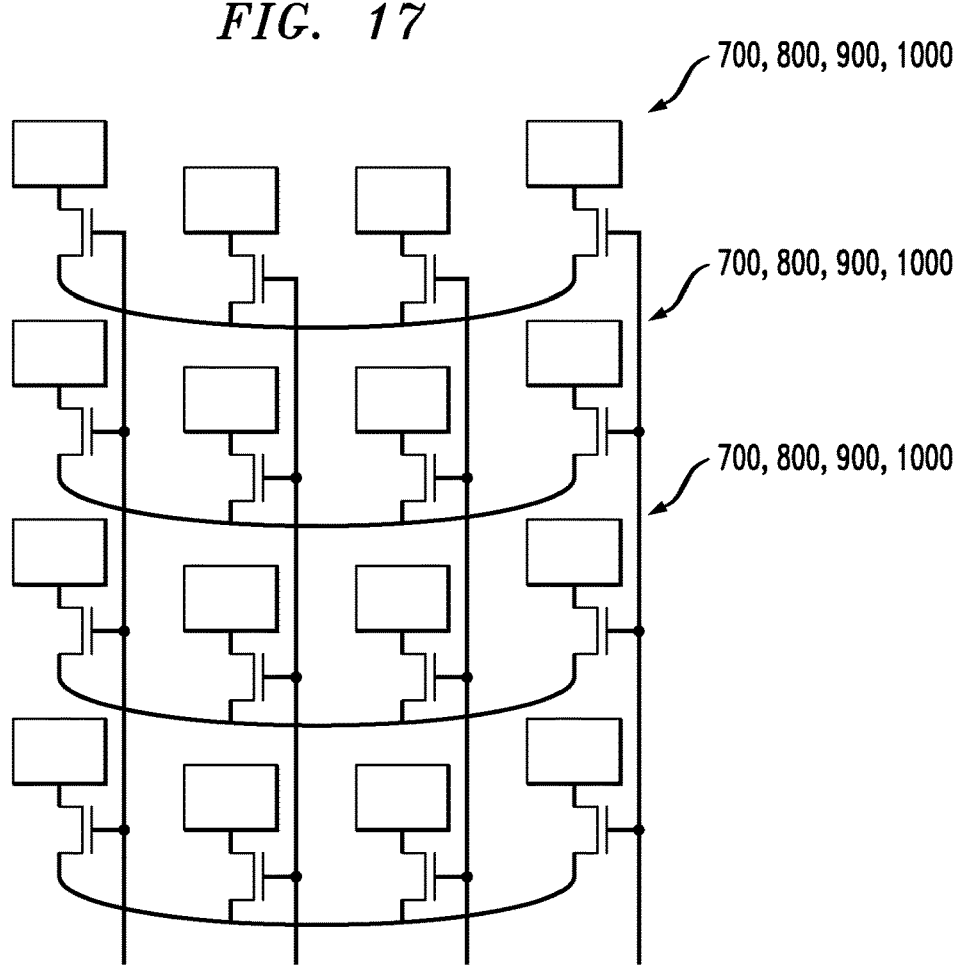
FIG. 17 illustrates an example sensor layer for an example intelligent container for distributing pills and capsules, in accordance with an example embodiment.

FIG. 17 illustrates an example sensor layer 1200 for an example intelligent container for distributing pills and capsules, in accordance with an example embodiment. The container can be a pill bottle, a pill box, and the like. In one example embodiment, a sensor layer 1200 lines the cylindrical wall of the pill bottle. In one example embodiment, a modular sensor layer 1200 lines the cylindrical wall of the pill bottle, the circular bottom of the pill bottle, and the circular cap of the pill bottle. Each portion of the modular sensor layer 1200 may incorporate its own microcontroller or the portions may be electrically coupled together to form one or more networks that may be read by the microcontroller 628. Similar modular sensor layers 1200 may be configured to line the walls of square containers, rectangular containers, oval containers, and the like. The sensors are created in a cage-like matrix structure that surrounds the contents of the packaging and shields the pill package.

Figure 18:
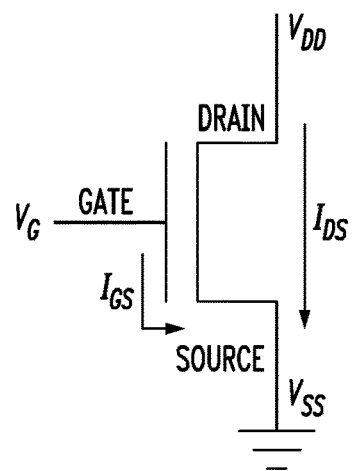
FIG. 18 illustrates a transistor for use as an active sensor in an example active sensor array, in accordance with an example embodiment.

FIG. 18 illustrates a transistor 1800 for use as an active sensor in an active sensor array, in accordance with an example embodiment. The transistor 1800 may be implemented with either P-type metal-oxide-semiconductor (PMOS) technology (utilizing a p-type source and drain and an n-type substrate, as schematically illustrated in FIG. 18) or N-type metal-oxide-semiconductor NMOS) technology (utilizing an n-type source and drain and a p-type substrate; not shown). In one example embodiment, the active sensor operates in the cut-off, linear, and saturation regions of the transistor when it has not been tampered with. When a package is tampered with such that the source to drain channel is destroyed, the transistor 1800 will not be capable of going into saturation. Thus, destruction of the transistor (the active sensor) indicates tampering.

Figure 19:
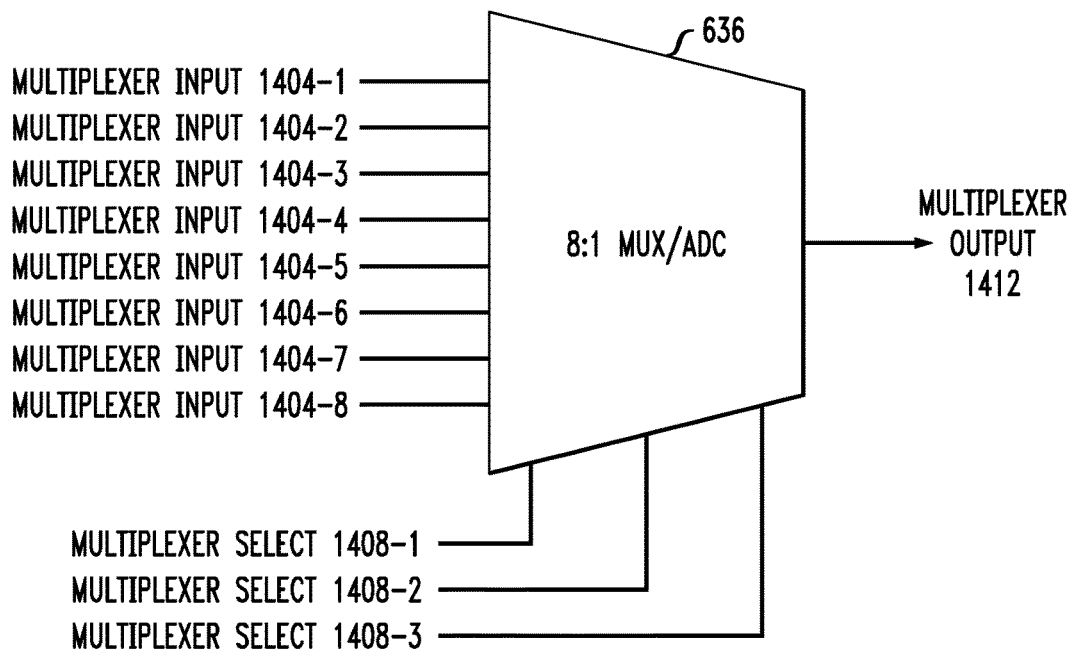
FIG. 19 is a block diagram of an example analog multiplexer and analog-to-digital converter, in accordance with an example embodiment.

FIG. 19 is a block diagram of an example analog multiplexer and analog-to-digital converter 636, in accordance with an example embodiment. In one example embodiment, the analog multiplexer is an 8:1 multiplexer utilizing three multiplexer select lines 1408-1, . . . , 1408-3 (collectively referred to as multiplexer select lines 1408 herein). Each column and/or row of a sensor network, such as the network of resistance wires 812, is connected to one of the multiplexer inputs 1404-1, . . . , 1404-8 (collectively referred to as multiplexer inputs 1404 herein). In the case of optical sensors 1000, each sensor 1000 has a dedicated multiplexer input 1404. The binary value on the multiplexer select lines 1408 identifies the multiplexer input 1404 that is selected by the analog multiplexer and converted by the analog-to-digital converter for output on multiplexer output 1412. In example embodiments where the sensors produce a digital output, a digital multiplexer is used to select one or more sensors (without the need for the analog-to-digital converter). In one example embodiment, intelligent sensors may share a multiplexer input 1404. For example, intelligent sensors that incorporate a communication interface for a shared communication link may share a multiplexer input 1404.

Figure 20:
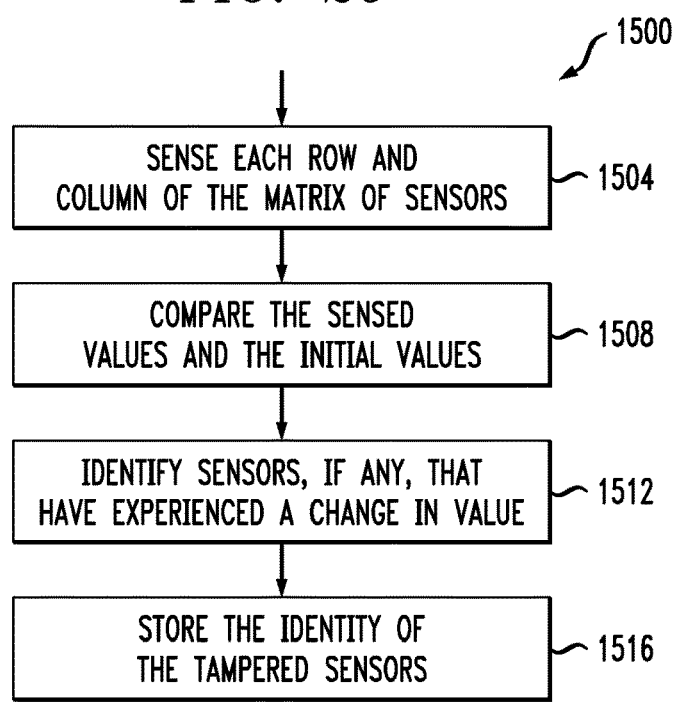
FIG. 20 is a flowchart for an example method for detecting medication counterfeiting, in accordance with an example embodiment.

FIG. 20 is a flowchart 1500 for an example method for detecting medication counterfeiting, in accordance with an example embodiment. In one example embodiment, the microcontroller 628 senses each column and row of a corresponding array 708, 1012 of sensors (operation 1504). The microcontroller 628 compares the values read with an initial or expected (pre-programmed) reading of the corresponding matrix 708, 1012 of sensors (operation 1508). In one example embodiment, the optical sensor 1000 compares an image of the pill with an earlier image or preprogrammed image of the pill, a color of the pill with a preprogrammed color of the pill, and the like. The microcontroller 628 then determines which sensor(s) have experienced a change from the initial or expected (pre-programmed) reading (operation 1512). For example, if only the values for row 3 and column 4 have changed, the microcontroller 628 will determine that the sensor located at row 3 and column 4 has been tampered with. In one example embodiment, the microcontroller 628 stores the identification of the tampered sensor(s) for relay to an external device via the RFID tag (or other communication device) (operation 1516). In one example embodiment, the identification of the tampered sensor(s) is stored with the timestamp that indicates the time that the tampering was detected.

In one example embodiment, once a package 600 reaches a consumer, the ability to determine when a slot has been opened may also be used to track a consumer's use of the medication and ensure, for example, that a patient is properly following medical instructions. For example, method 1500 may be used to record the time that each slot was opened. The recorded times may then be compared with the prescribed time and dosage for consuming the meditation.

Given the discussion thus far, it will be appreciated that, in general terms, an exemplary method, according to an aspect of the invention, includes the operations of sensing a value from each column and row of a corresponding matrix of sensors 708, 1012 (operation 1504); comparing the values with an initial or expected reading of the corresponding matrix of sensors 708, 1012 to identify one or more columns and one or more rows with changed values (operation 1508); and determining one or more sensors that correspond to the one or more identified columns and the one or more identified rows (operation 1512).

In one example embodiment, a device for detecting a tampering of a product in a product packaging material comprises: a network of sensors 712, 812, 912, 1012 integrated into the product packaging material; a microcontroller 628, the microcontroller 628 configured to detect, by accessing the sensors of the sensor network 712, 812, 912, 1012, the tampering of the product packaging material; and a communication device for relaying information regarding a status of the product packaging material.

In one example embodiment, the device further comprises a thin-film battery for powering at least the microcontroller 628. In one example embodiment, the thin-film battery is configured to be charged by a scanning device that is obtaining information from the microcontroller 628. In one example embodiment, the device further comprises a flexible substrate with a thickness of 1-2 mm, the flexible substrate configurable to be molded onto the product packaging material. In one example embodiment, the flexible substrate resides between a cover layer 624 and an adhesive layer 616 of the product packaging material.

In one example embodiment, the device further comprises an analog multiplexer and an analog-to-digital converter (ADC) 636 configured to enable the microcontroller 628 to sample the sensors of the sensor network 712, 812, 912, 1012. In one example embodiment, the microcontroller 628 is configured to store the obtained information, identify one or more locations of the product packaging material that have been tampered with, and create a timestamp indicating a time of accessing the sensor. In one example embodiment, the microcontroller 628 is configured to encrypt and wirelessly relay the data to an external device via a radio frequency identification tag 632 or wireless link. In one example embodiment, each sensor of the sensor network 712 is implemented as a capacitor 700, the capacitor 700 comprising at least two parallel metal plates 704-1, 704-2, a capacitance of the sensor changing in response to a tampering of the product packaging material. In one example embodiment, each sensor of the sensor network 812 is implemented as a resistance sensor 800 comprising a metal wire line 804-1, a resistance of the resistance sensor 800 changing in response to a tampering of the product packaging material.

In one example embodiment, the resistance sensor 800 acts as a capture strain gauge that measures an amount of force applied to the resistance sensor 800 and a resistive value of the resistance sensor 800 is relative to the amount of force. In one example embodiment, each sensor of the sensor network 912 is implemented as a tank circuit 904, a phase or a frequency of the sensor changing in response to a tampering of the product packaging material. In one example embodiment, the microcontroller 628 is programmed with an expected frequency, phase, or both of each sensor and wherein the tank circuit 904 generates another phase, another frequency, or no frequency when the product packaging material is tampered with. In one example embodiment, the tank circuit 904 is continuously active or only activated periodically by the microcontroller 628. In one example embodiment, each sensor of the sensor network 1012 is implemented as an optical sensor 1000.

In one example embodiment, the optical sensor 1000 is powered through near-field communications (NFC) and can read a specific barcode, a hologram, or a signature of a medication. In one example embodiment, the optical sensor 1000 can detect a pattern from reflected light or an embedded character in a medication. In one example embodiment, the microcontroller 628 is programmed with an expected signature of the medication and the information obtained from the optical sensor 1000 is analyzed to determine if the medication is genuine. In one example embodiment, the network of sensors 712, 812, 912, 1012 is modular and configured to line the walls of cylindrical containers, square containers, rectangular containers, oval containers, or any combination thereof.

Figure 21:
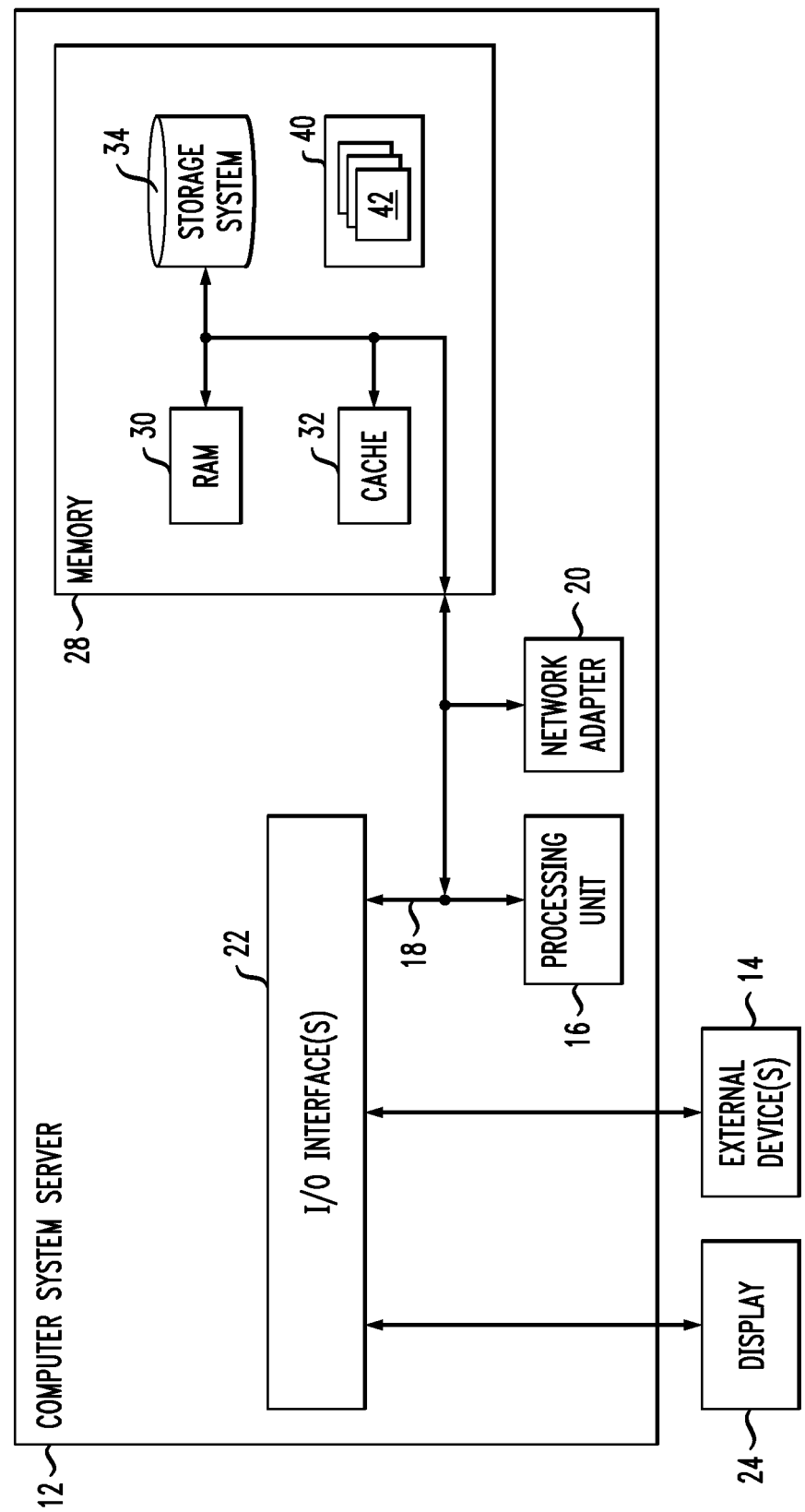
FIG. 21 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 21 depicts a computer system that may be useful in implementing one or more aspects and/or elements of the invention, also representative of a cloud computing node according to an embodiment of the present invention. Referring now to FIG. 21, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 21, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 21, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 21) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device for detecting a tampering of a product in a product packaging material, the device comprising:
   a plurality of optical sensors arranged into a network of sensors and integrated into the product packaging material, wherein each optical sensor is configured to detect a pattern from reflected light and an embedded character in a medication in the product packaging material;
   a microcontroller configured to detect, by accessing the optical sensors, a signature of the medication, wherein the microcontroller is programmed with an expected signature of the medication and the information obtained from the optical sensor is analyzed to determine if the medication is genuine; and
   a communication device for relaying information regarding a status of the product by the microcontroller based on the detected signature.

2. The device of claim 1, the device further comprising:
   a plurality of resistance sensors arranged into a network of resistance sensors and integrated into the product packaging material, each resistance sensor comprising a metal wire line, each resistance sensor configured to change a corresponding resistance in response to the tampering of the product packaging material; and
   wherein the microcontroller is further configured to detect, by accessing the resistance sensors, the resistance of at least one of the resistance sensors and
   the communication device is further configured to relay information regarding a status of the product packaging material corresponding to the resistance of at least one of the resistance sensors detected by the microcontroller.

3. The device of claim 2, wherein the microcontroller is configured to detect a change in a corresponding resistance of the at least one of the resistance sensors, store an identification of the at least one of the resistance sensors, and create a timestamp indicating a time of accessing each of the least one of resistance sensors.

4. The device of claim 2, further comprising a digital multiplexer configured to enable the microcontroller to sample the resistance sensors.

5. The device of claim 1, further comprising a thin-film battery for powering at least the microcontroller.

6. The device of claim 5, wherein the thin-film battery is configured to be charged by a scanning device that is obtaining information from the microcontroller.

7. The device of claim 1, further comprising a flexible substrate with a thickness of about 1-2 millimeters, the flexible substrate molded onto the product packaging material.

8. The device of claim 1, wherein a flexible substrate resides between a cover layer and an adhesive layer of the product packaging material.

9. The device of claim 1, further comprising an analog multiplexer and an analog-to-digital converter (ADC) configured to enable the microcontroller to sample the resistance sensors.

10. The device of claim 1, wherein the microcontroller is configured to encrypt and wirelessly relay the information to an external device via a radio frequency identification tag or wireless link.

11. The device of claim 1, wherein the network of optical sensors is powered through near-field communications (NFC) and can read a specific barcode, a hologram, or a signature of a product in the product packaging material.

12. The device of claim 1, wherein the network of sensors is modular and configured to line one or more walls of cylindrical containers, square containers, rectangular containers, oval containers, or any combination thereof.

13. The device of claim 1, further comprising:
   an analog multiplexer configured to select a row, a column or both of the network of sensors; and
   an analog-to-digital converter configured to convert a signal from the selected row or column to a digital value.

* * * * *